W. R. CADY.
Beer Attachments for Soda-Water Apparatus.

No. 138,002.                      Patented April 22, 1873.

Witnesses,

Inventor,
Wm. R. Cady

UNITED STATES PATENT OFFICE.

WILLIAM R. CADY, OF LOWELL, ASSIGNOR TO JAMES W. TUFTS, OF MEDFORD, MASSACHUSETTS.

IMPROVEMENT IN BEER ATTACHMENTS FOR SODA-WATER APPARATUS.

Specification forming part of Letters Patent No. 138,002, dated April 22, 1873; application filed April 4, 1873.

*To all whom it may concern:*

Be it known that I, WILLIAM R. CADY, of Lowell, in the county of Middlesex and State of Massachusetts, have invented an Improved Beer Attachment for Soda-Water Apparatus, of which the following is a full, clear, and exact description, reference being had to the accompanying drawing, making part of this specification, in which—

Figure 1:
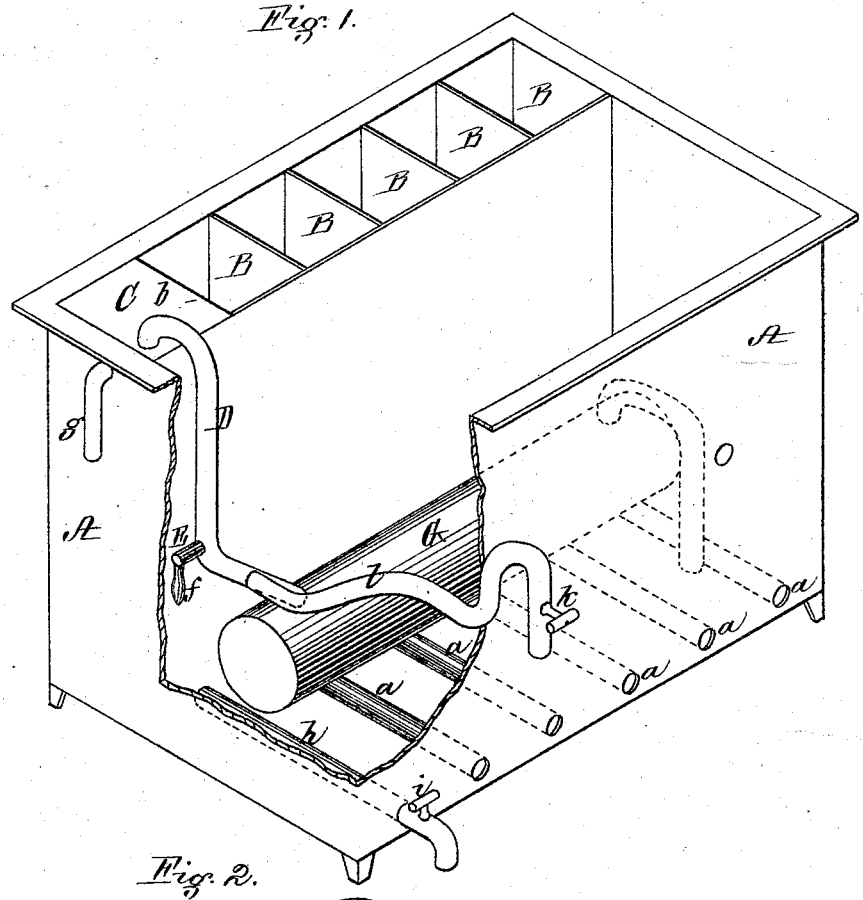
Figure 2:
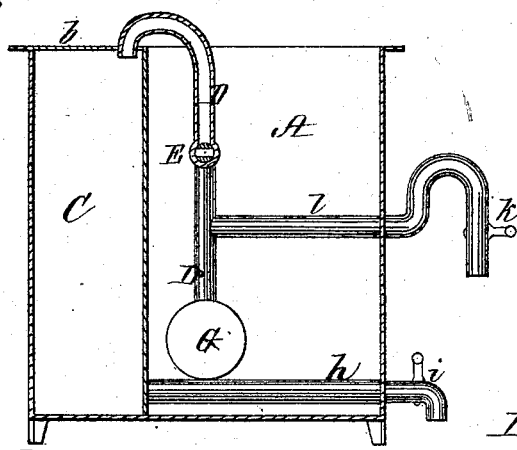

Figure 1 is a perspective view of a soda-water apparatus having my improved beer attachment applied thereto. Fig. 2 is a vertical section through the same.

My invention has for its object to provide a soda-water apparatus with an attachment whereby beer can be drawn therefrom by its own gravity without foam, thus avoiding the necessity of previously drawing the beer into a pitcher or other receptacle, as heretofore, which is not only inconvenient, but furthermore objectionable, as it does not keep the beer cool, and allows it to become stale; and my invention consists in a soda-water apparatus, the interior of which is provided with a vessel or receptacle into which the beer is admitted through an inlet-pipe leading from the barrel or fountain, and provided with a cut-off or stop-cock, the beer being drawn by its own gravity from the bottom of the receptacle, without foam, through a suitable draft-cock; an auxiliary draft-cock connected with that portion of the inlet-pipe or conductor which contains beer under pressure being employed, if desired, to produce a little foam at the top of the beer in the glass.

To enable others skilled in the art to understand and use my invention, I will proceed to describe the manner in which I have carried it out.

In the said drawing, A represents the casing of a soda-water apparatus, within which are placed, as usual, the sirup cans or vessels B, provided with outlet or delivery pipes *a* leading to the sirup-cocks, (not shown.) C is a receptacle similar to one of the sirup-vessels B, and closed at the top by a tight cover, *b*. D is the inlet-pipe leading from the barrel or fountain containing the beer under pressure, and passing through the cover *b*. This pipe D is provided with a cut-off or stop-cock, E, the stem of which passes through the casing to admit of its being operated by turning a handle, *f*, placed in an accessible position. On opening the cock E the beer is admitted from the barrel or fountain to the receptacle C in a foaming state, the foam instantly rising to the surface, a waste-pipe, *g*, being employed to indicate when the receptacle is full, and to notify the attendant to shut off the supply. Any other suitable indicator may, however, be used instead of the pipe *g*. The inlet-pipe D is connected with a cooler, G, so that the beer will be cooled previous to entering the vessel C; but as this vessel is situated within the apparatus, and in close proximity to the ice therein, it serves to keep the beer within it perfectly cool until it is drawn. *h* is an outlet or delivery pipe connected with the bottom of the beer-vessel C, and provided with a draft-cock, *i*, through which the beer is drawn by its own gravity, and without any foam, into the drinking-vessel. If desired, a little foam may be produced on the top of the beer by drawing from an auxiliary cock, *k*, at the end of the pipe *l*, connected with the inlet-pipe D at some point between the stop-cock E and the barrel or fountain; and if any one should desire it, the beer may be drawn entirely from the cock *k* in its ordinary foaming state.

From the foregoing it will be seen that the beer can be drawn at will from the barrel or fountain into the receptacle within the apparatus, where it is kept cool and ready at any time to be drawn by its own gravity without foam into the drinking-vessel; and I am thus enabled to secure compactness and avoid all of the objections incident to apparatus where it is necessary to draw the beer into a pitcher or other receptacle outside the apparatus in order to avoid a superabundance of foam.

Claims.

What I claim as my invention, and desire to secure by Letters Patent, is—

1. The beer vessel or receptacle C, arranged within a soda-water apparatus, and provided with an outlet or delivery pipe, *h*, and draft-cock $i$, in combination with the inlet-pipe D leading from the barrel or fountain, and the cut-off or stop-cock E, all operating substantially in the manner and for the purpose set forth.

2. In combination with the above, the auxiliary pipe $l$ with its draft-cock $k$ connected with the inlet-pipe D between the stop-cock E and the barrel or fountain, substantially as and for the purpose described.

Witness my hand this 2d day of April, A. D. 1873.

WM. R. CADY.

In presence of—
 P. E. TESCHEMACHER,
 N. W. STEARNS.